United States Patent
Huang (10) Patent No.: US 7,607,254 B1
(45) Date of Patent: Oct. 27, 2009

(54) MOUSE TRAP HAVING A TRIGGERING PLATE

(76) Inventor: Chang-Hsiu Huang, No. 156, Sec. 1, Yaofong Road, Pusin Township, Changhua County 513 (TW)

( * ) Notice: Subject to any disclaimer, the term of this patent is extended or adjusted under 35 U.S.C. 154(b) by 0 days.

(21) Appl. No.: 12/130,219

(22) Filed: May 30, 2008

(51) Int. Cl.
*A01M 23/00* (2006.01)
*A01M 23/10* (2006.01)
*A01M 23/24* (2006.01)
*A01M 23/26* (2006.01)

(52) U.S. Cl. .................... 43/85; 43/88; 43/58; 43/77; 43/81

(58) Field of Classification Search .......... 43/85, 43/88, 58, 77, 79, 81, 71, 73–75
See application file for complete search history.

(56) References Cited

U.S. PATENT DOCUMENTS

| | | | | |
|---|---|---|---|---|
| 31,651 A * | 3/1861 | Walker | ............ | 43/74 |
| 89,300 A * | 4/1869 | Fenn | ............ | 43/75 |
| 89,429 A * | 4/1869 | Owen | ............ | 43/74 |
| 91,744 A * | 6/1869 | Henert | ............ | 43/79 |
| 106,107 A * | 8/1870 | Ball | ............ | 43/74 |
| 210,578 A * | 12/1878 | Terrell | ............ | 43/74 |
| 309,781 A * | 12/1884 | Hall | ............ | 43/75 |
| 477,966 A * | 6/1892 | Steiner | ............ | 43/85 |
| 539,900 A * | 5/1895 | Hulings | ............ | 43/74 |
| 674,551 A * | 5/1901 | Carlsen | ............ | 43/79 |
| 714,281 A * | 11/1902 | Chasse | ............ | 43/85 |
| 749,790 A * | 1/1904 | Hendryx | ............ | 43/74 |
| 849,070 A * | 4/1907 | Stilson | ............ | 43/75 |
| 856,889 A * | 6/1907 | Lamp | ............ | 43/75 |
| 901,851 A * | 10/1908 | Thompson | ............ | 43/85 |
| 925,972 A * | 6/1909 | Wilson | ............ | 43/79 |
| 941,988 A * | 11/1909 | Gunn | ............ | 43/75 |
| 1,072,172 A * | 9/1913 | Schell | ............ | 43/79 |
| 1,077,452 A * | 11/1913 | Burke | ............ | 43/73 |
| 1,176,815 A * | 3/1916 | Cowan | ............ | 43/67 |
| 1,213,997 A * | 1/1917 | Arrioja | ............ | 43/74 |
| 1,214,060 A * | 1/1917 | Mutz | ............ | 43/74 |
| 1,222,406 A * | 4/1917 | Jakab | ............ | 43/61 |
| 1,288,712 A * | 12/1918 | Siemieczko | ............ | 43/74 |
| 1,297,344 A * | 3/1919 | Glass | ............ | 43/79 |
| 1,479,283 A * | 1/1924 | Conrad | ............ | 43/74 |
| 1,510,346 A * | 9/1924 | Smith | ............ | 43/74 |
| 1,512,513 A * | 10/1924 | Ward | ............ | 43/73 |
| 1,523,375 A * | 1/1925 | Wirtjes | ............ | 43/75 |
| 1,578,196 A * | 3/1926 | Hills | ............ | 43/67 |
| 1,645,225 A * | 10/1927 | Brzykcy | ............ | 43/74 |

(Continued)

FOREIGN PATENT DOCUMENTS

DE        4335052 A1 *   4/1995

(Continued)

*Primary Examiner*—Darren W Ark
(74) *Attorney, Agent, or Firm*—Rosenberg, Klein & Lee (57) ABSTRACT

A mouse trap having a triggering plate is disclosed. It mainly includes a stationary base, rotatable cover, triggering plate, and a connecting rod assembly. When a mouse presses down this rear plate portion of the triggering plate, this rear plate portion moves down accordingly. It simultaneously lifts up a linking portion of the connecting rod assembly. Then, it will activate this rotatable cover to rotate from an opening position to a close position for avoiding a caught mouse escaping out. Besides, this invention's triggering sensibility is extremely high. It can trap a mouse that just tries to eat the bait. Plus, the caught mouse is hard to escape.

1 Claim, 9 Drawing Sheets

U.S. PATENT DOCUMENTS

| | | | | |
|---|---|---|---|---|
| 1,659,767 | A * | 2/1928 | Curtis | 43/74 |
| 1,708,659 | A * | 4/1929 | Brzykcy | 43/74 |
| 1,758,952 | A * | 5/1930 | Kness | 43/74 |
| 1,796,380 | A * | 3/1931 | Lyden | 43/74 |
| 1,989,174 | A * | 1/1935 | Schwenk | 43/85 |
| 2,059,937 | A * | 11/1936 | Ellis | 43/81 |
| 2,096,368 | A * | 10/1937 | Ward | 43/73 |
| 2,101,788 | A * | 12/1937 | Benson | 43/74 |
| 2,120,812 | A * | 6/1938 | Rinaldy et al. | 43/85 |
| 2,170,470 | A * | 8/1939 | Chappell | 43/74 |
| 2,197,121 | A * | 4/1940 | Blasen | 43/74 |
| 2,242,648 | A * | 5/1941 | La Rocca | 43/85 |
| 2,250,823 | A * | 7/1941 | Conners | 43/71 |
| 2,256,048 | A * | 9/1941 | Evans | 43/75 |
| 2,416,481 | A * | 2/1947 | Hollenbeck | 43/81 |
| 2,427,148 | A * | 9/1947 | Luckton | 43/85 |
| 2,433,913 | A * | 1/1948 | Kness | 43/74 |
| 2,454,476 | A * | 11/1948 | Price | 43/74 |
| 2,460,417 | A * | 2/1949 | Goostrey | 43/85 |
| 2,471,540 | A * | 5/1949 | Phillips | 43/74 |
| 2,481,800 | A * | 9/1949 | Tyler | 43/85 |
| 2,506,055 | A * | 5/1950 | Benson | 43/85 |
| 2,510,655 | A * | 6/1950 | Price et al. | 43/85 |
| 2,578,856 | A * | 12/1951 | Story | 43/85 |
| 2,594,182 | A * | 4/1952 | Kness | 43/74 |
| 3,339,306 | A * | 9/1967 | Yekel et al. | 43/85 |
| 3,530,613 | A * | 9/1970 | Brubakken | 43/85 |
| 3,688,432 | A * | 9/1972 | Fruits | 43/61 |
| 3,762,093 | A * | 10/1973 | Rohde | 43/61 |
| 3,992,803 | A * | 11/1976 | Kaiser | 43/83 |
| 4,155,193 | A * | 5/1979 | MacDonald | 43/71 |
| 4,253,264 | A * | 3/1981 | Souza | 43/73 |
| 4,318,241 | A * | 3/1982 | Fassauer | 43/58 |
| 4,363,183 | A * | 12/1982 | Drdlik | 43/81 |
| 4,462,182 | A * | 7/1984 | French | 43/85 |
| 4,557,066 | A * | 12/1985 | Godwin, Jr. | 43/60 |
| 4,569,149 | A * | 2/1986 | Sensing et al. | 43/61 |
| 4,769,942 | A * | 9/1988 | Copenhaver, Sr. | 43/61 |
| 4,831,766 | A * | 5/1989 | Giglietti | 43/61 |
| 5,148,624 | A * | 9/1992 | Schmidt | 43/81 |
| 5,172,512 | A * | 12/1992 | Bodker et al. | 43/81 |
| 5,175,956 | A * | 1/1993 | Hover et al. | 43/58 |
| 5,175,957 | A * | 1/1993 | West | 43/85 |
| 5,305,545 | A * | 4/1994 | Cerullo | 43/74 |
| 5,325,621 | A * | 7/1994 | Giglietti | 43/61 |
| 6,009,661 | A * | 1/2000 | Lloyd | 43/67 |
| 6,125,576 | A * | 10/2000 | Knuppel | 43/74 |
| 6,230,434 | B1 * | 5/2001 | Knuppel | 43/74 |
| 6,523,713 | B1 * | 2/2003 | Helms | 220/831 |
| 7,231,738 | B2 * | 6/2007 | Watson et al. | 43/85 |
| 7,506,471 | B2 * | 3/2009 | Rodgers et al. | 43/85 |
| 2006/0185223 | A1 * | 8/2006 | Watson et al. | 43/85 |
| 2007/0017149 | A1 * | 1/2007 | Rodgers et al. | 43/85 |
| 2007/0266618 | A1 * | 11/2007 | Sturgeon et al. | 43/85 |

FOREIGN PATENT DOCUMENTS

| | | |
|---|---|---|
| FR | 2614179 A1 * | 10/1988 |
| WO | WO 9509531 A1 * | 4/1995 |
| WO | WO 2005053392 A1 * | 6/2005 |
| WO | WO 2005074680 A1 * | 8/2005 |
| WO | WO 2006130095 A1 * | 12/2006 |

* cited by examiner

MOUSE TRAP HAVING A TRIGGERING PLATE

FIELD OF THE INVENTION

The present invention relates to a mouse trap, especially to a mouse trap having a triggering plate. About this invention, the triggering sensibility is extremely high. It can trap a mouse that just tries to eat the bait. Plus, the caught mouse is hard to escape.

DESCRIPTION OF THE PRIOR ART

Referring to FIGS. 1, 2, 3, 4, 5A and 5B, the traditional mouse trap includes a stationary part 50, a rotatable cap 60, and a linking assembly 70.

Figure 1:
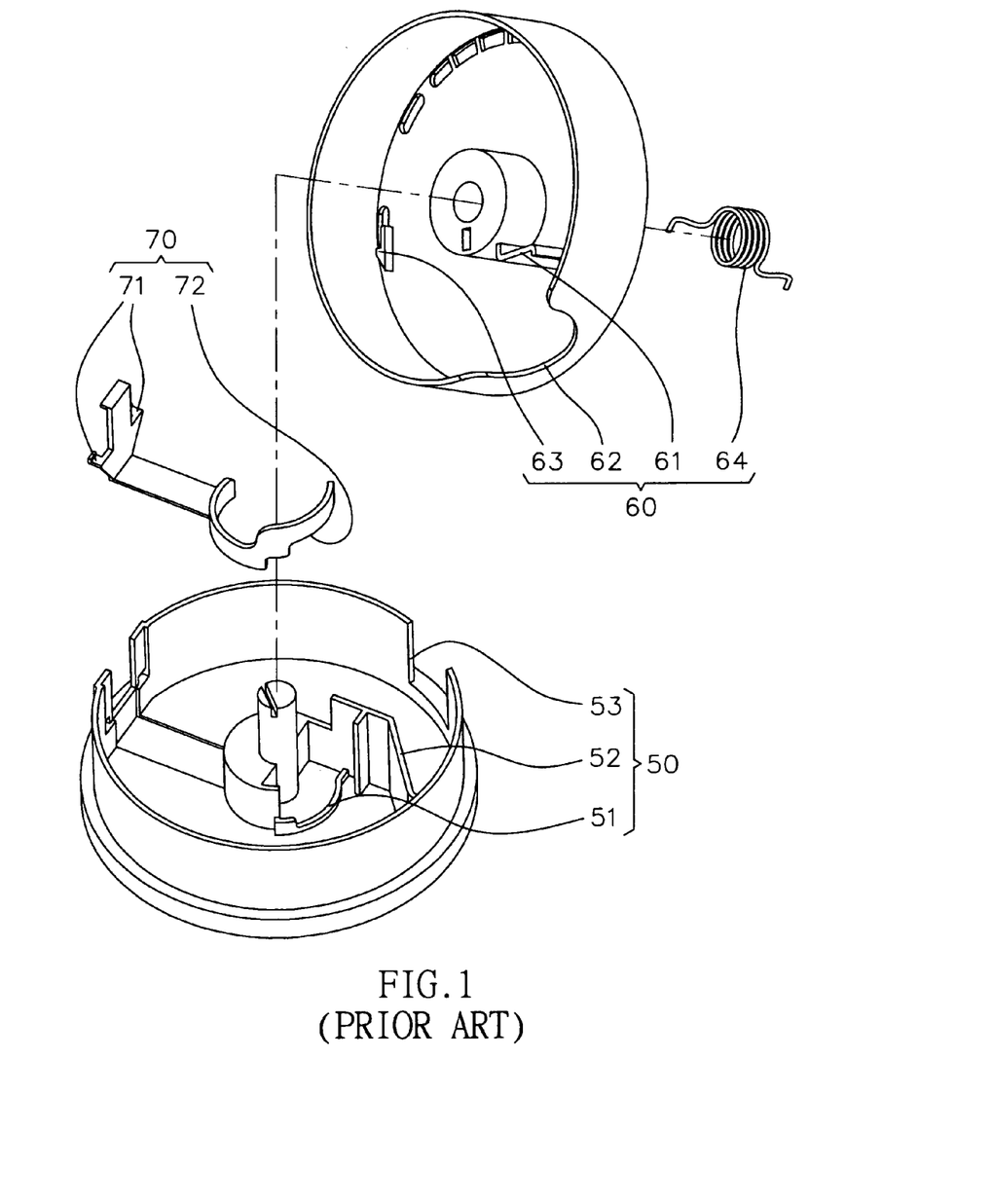
FIG. 1 is a perspective view of a disassembled traditional device.
Figure 2:
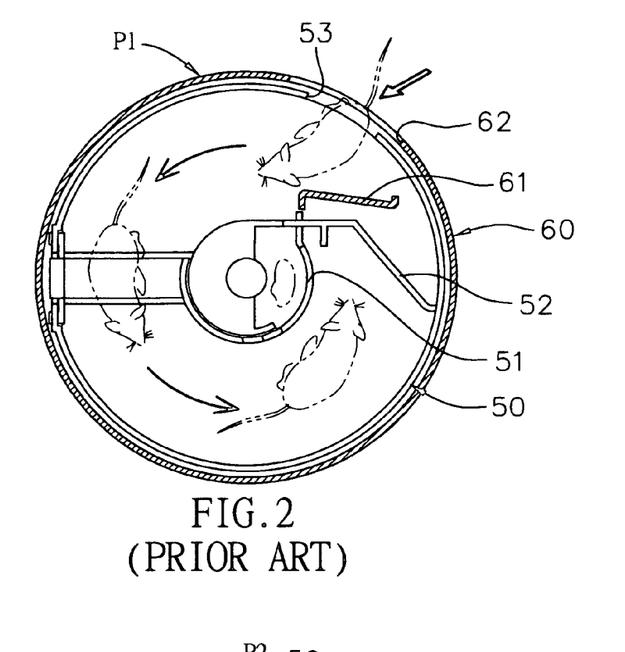
FIG. 2 is a view showing a traditional device before triggering.
Figure 3:
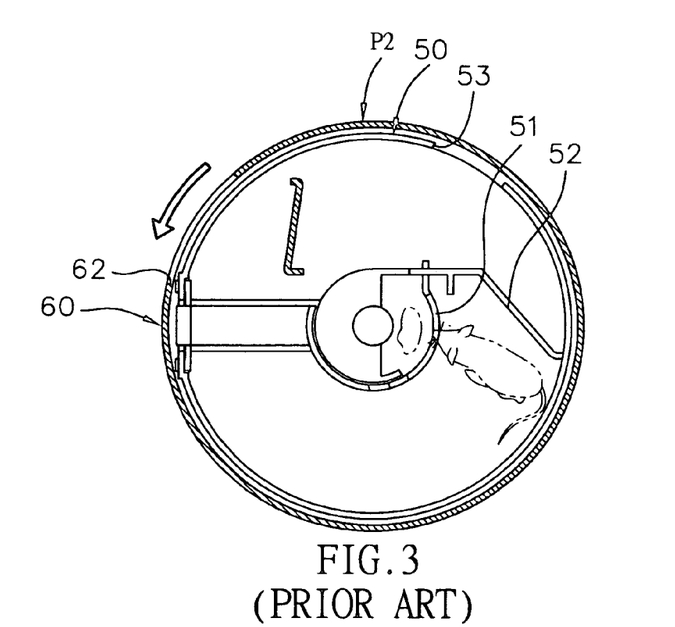
FIG. 3 is a view showing a traditional device just triggered.
Figure 4:
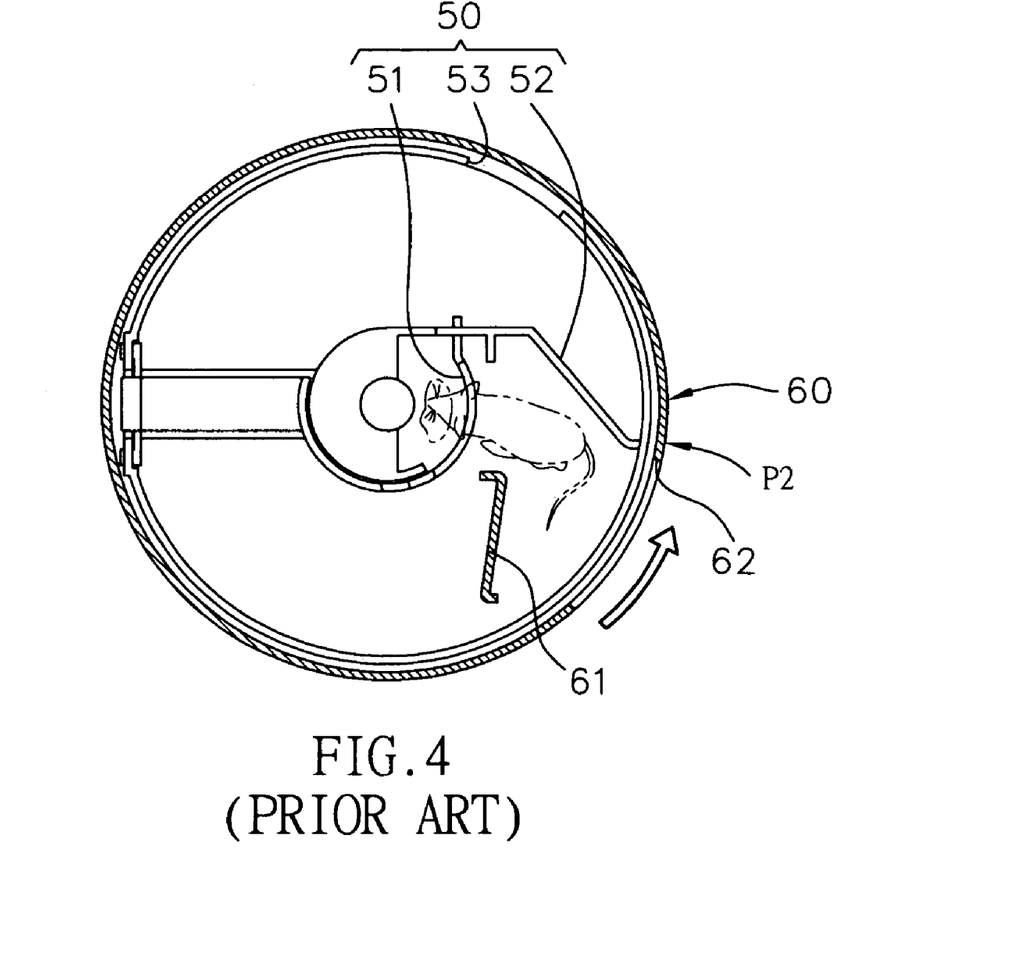
FIG. 4 is a view showing a traditional device after triggering a certain time.

This stationary part 50 has a central bait container 51, a first blocker 52, and a first hole 53. The function of this central bait container 51 is to install the mouse bait.

The rotatable cap 60 has a second blocker 61, a second hole 62, a locking part 63, and a torque spring 64. The function of this torque spring 64 is to make the rotatable cap 60 rotating from an open position P1 to a close position P2.

The linking assembly 70 has a pair of pivoting parts 71 and a lifting part 72. These two pivoting parts 71 are substantially pivoted (or hinged) on the stationary base 50. The linking assembly 70 can be locked with or separated from the locking part 63.

Figure 5A:
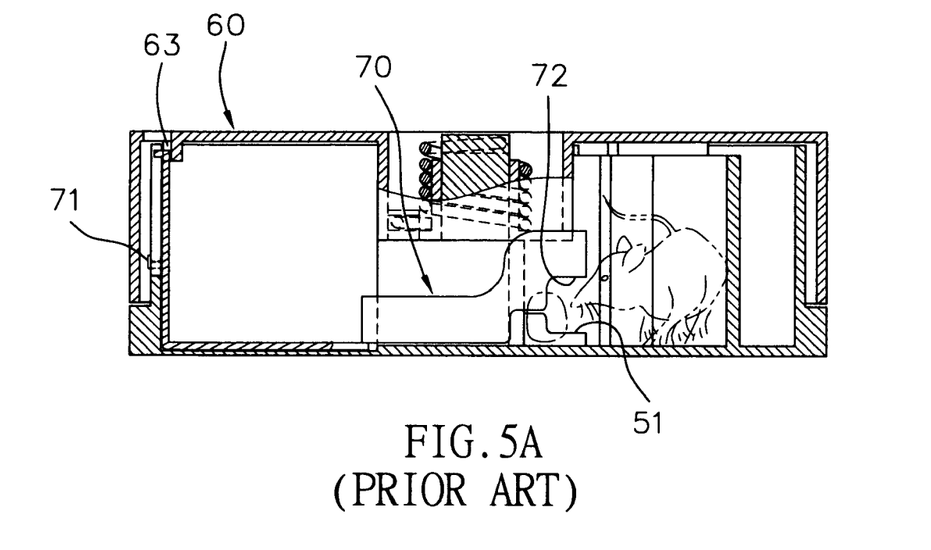
FIG. 5A is a cross-sectional view showing a traditional device before triggering.
Figure 5B:
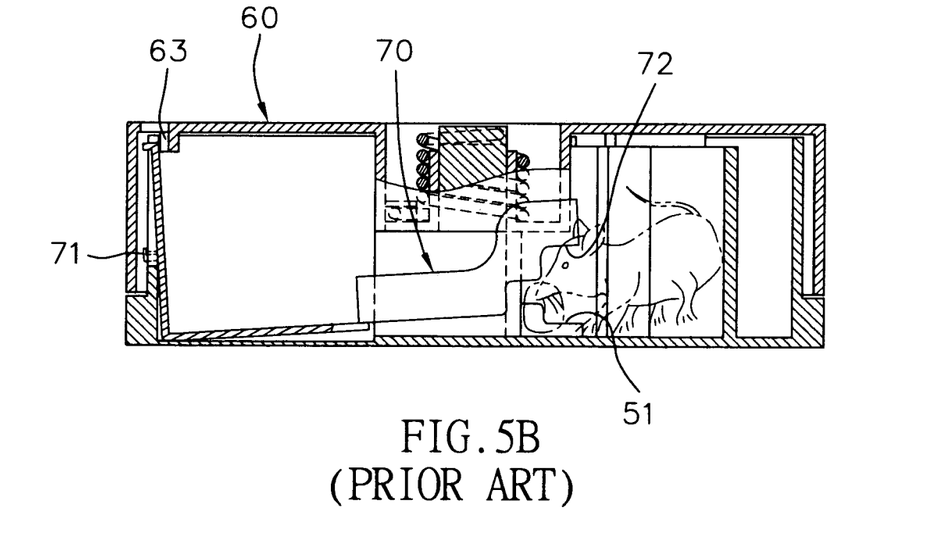
FIG. 5B is a cross-sectional view showing a traditional device after triggering.

Therefore, a mouse crawls in to search for the mouse bait. Finally, this mouse contacts with the lifting part 72 and then lifts up this lifting part 72. If such lifting reaches a preset height, the tilted linking assembly 70 will disengage with the locking part 63 (as shown in FIG. 5B) so that the rotatable cap 60 will rotate from its close position P1 to its open position P2.

However, the traditional device still has many disadvantages.

[1] Its triggering sensibility is low. In the traditional one, the lifting part 72 must be lifted up above the preset height. Otherwise, it will not trigger. It is assumed that the preset height is 2 mm. If the mouse is smaller or this mouse is very cautious, it might lift up only 1.75 mm. Under this condition, the lifting height is not enough. It will not work. The bait could be eaten, but this mouse won't be caught. Therefore, its triggering sensibility is low.

[2] It will not be caught if the mouse that just tries to eat the bait. In this traditional device, the lift-up height is crucial. No lifting or small lifting cannot trigger this traditional device. It is possible that a mouse crawls in this device without eating the bait ((just smelling only) and it decides not to touch the lifting part 72 (some mice are very cautious). Then, it will not trigger. Therefore, the overall capture efficiency is relative low.

[3] The caught mouse still has a chance to escape. In the traditional device, no sharp thorn is secured on the first blocker 52 or the second blocker 61. The struggling mouse still is possible to push the second blocker 61 back so as to make the rotatable cap 60 return to its original position. Then, this mouse still has a chance to escape.

SUMMARY OF THE INVENTION

The primary object of the present invention is to provide a mouse trap having a triggering plate. In which, the triggering sensibility is extremely high.

The next object of the present invention is to provide a mouse trap having a triggering plate. It can trap a mouse that just tries to eat the bait.

Another object of the present invention is to provide a mouse trap having a triggering plate. The caught mouse is hard to escape.

DETAILED DESCRIPTION OF THE PREFERRED EMBODIMENT

Figure 6:
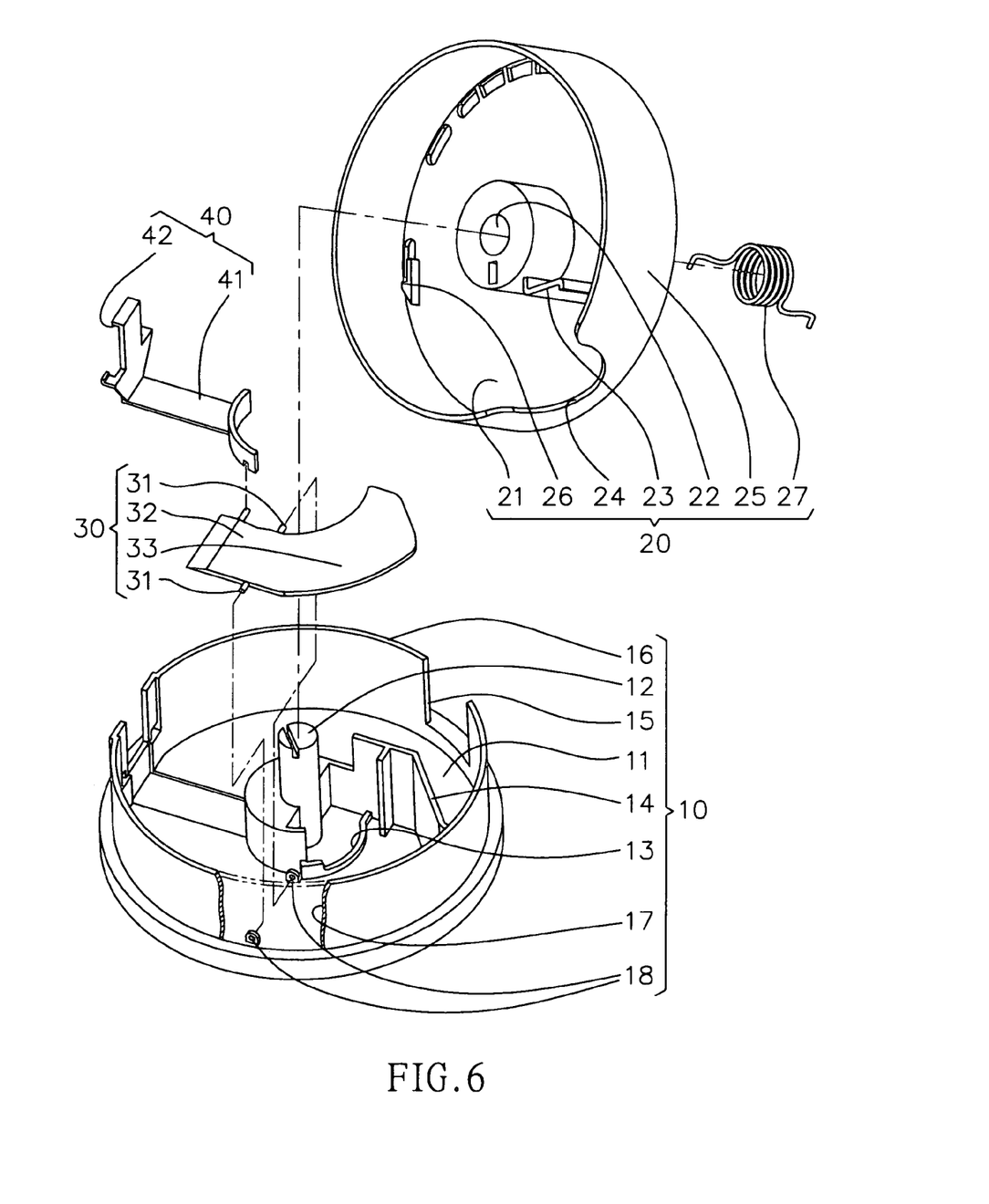
FIG. 6 is a perspective view illustrating the disassembled condition of the present invention.
Figure 7:
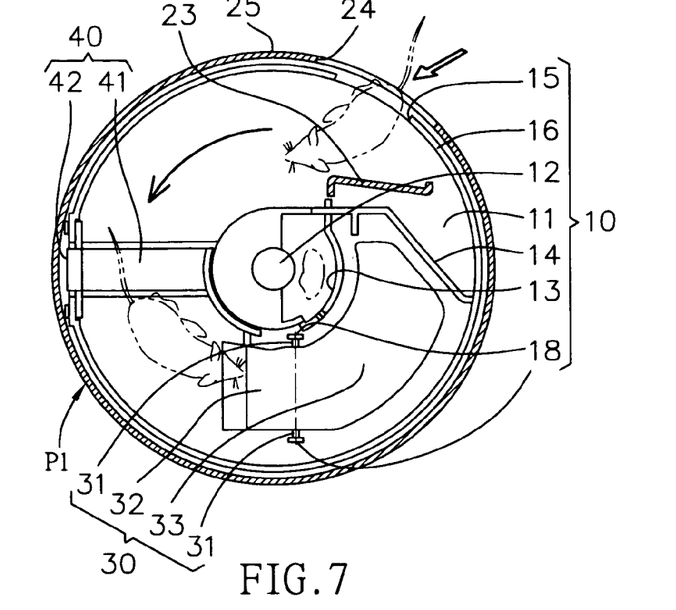
FIG. 7 is a view depicting this invention before triggering.
Figure 10A:
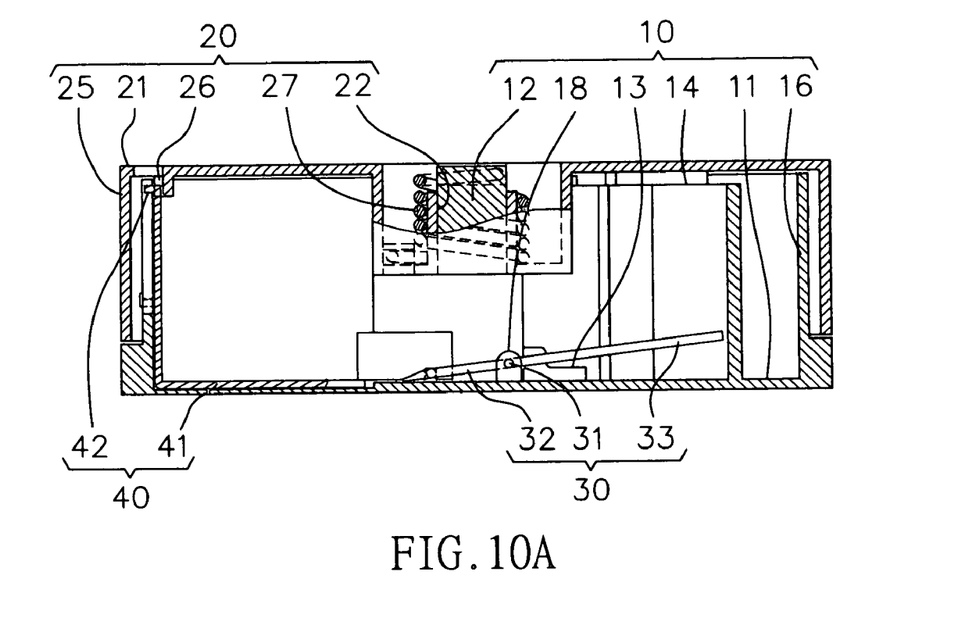
FIG. 10A is a cross-sectional view showing this invention before triggering.

Referring to FIGS. 6, 7, and 10A, the present invention relates to a mouse trap having a triggering plate. It mainly includes a stationary base 10, rotatable cover 20, triggering plate 30, and a connecting rod assembly 40.

With regard to this stationary base 10, it has a circular bottom 11, a central shaft 12, central bait housing 13, a first stopper 14, a first opening 15, a fixed outer wall 16, a first receiving portion 17, and a pair of pivoting seats 18. The central bait housing 13 is secured on a middle part of this circular bottom 11. The central shaft 12 is extending upwards from the central bait housing 13. The fixed outer wall 16 is disposed on an outer edge of the circular bottom 11.

About this rotatable cover 20, it has a circular cover 21, a central shaft hole 22, a second stopper 23, a second opening 24, a rotatable outer wall 25, a locking portion 26 and a torque generator 27. The function of the central shaft hole 22 is to pivot with the central shaft 12. Therefore, the rotatable cover 20 can be rotated on this stationary base 10. The torque generator 27 (such as a spring, a resilient element or the like) is provided to create a torque that forces the rotatable cover 20 tending to rotate from an open position P1 to a close position P2.

Regarding the triggering plate 30, it has a pair of pivoting protrusions 31, a front plate portion 32, and a rear plate portion 33. These pivoting protrusions 31 are pivoted within the pivoting seats 18 (working like a fulcrum).

Figure 10B:
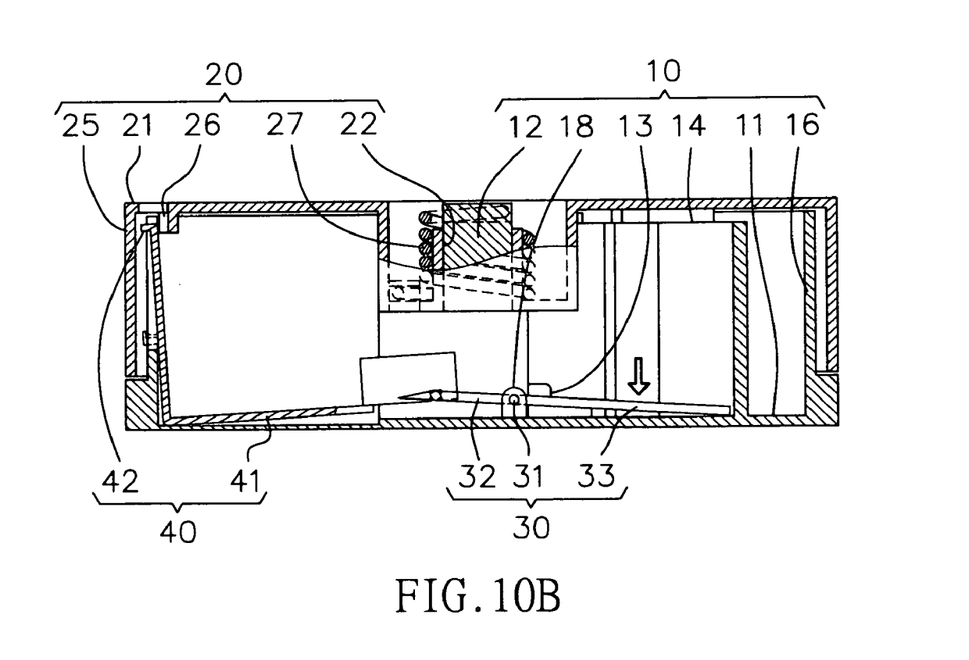
FIG. 10B is a cross-sectional view showing this invention after triggering.

Concerning this connecting rod assembly 40, it has a linking portion 41 and an activating portion 42. This linking portion 41 has two ends. One end of the linking portion 41 connects to the front plate portion 32. The other end of the linking portion 41 connects to the activating portion 42. A relationship between the activating portion 42 and the locking portion 26 is selected from engagement (or called locking; as shown in FIG. 10A) or separation (or called releasing; as shown in FIG. 10B).

When a predetermined weight applies on the rear plate portion 33, the rear plate portion 33 will move down and the front plate portion 32 will lift up simultaneously. Meanwhile, it will further lift up the linking portion 41. Then, the activating portion 42 and the locking portion 26 become separated. Consequently, the rotatable cover 20 will rotate from the opening position P1 to the close position P2. Thus, a caught object (such as a mouse) is blocked by the second stopper 23. It cannot escape.

Figure 11:
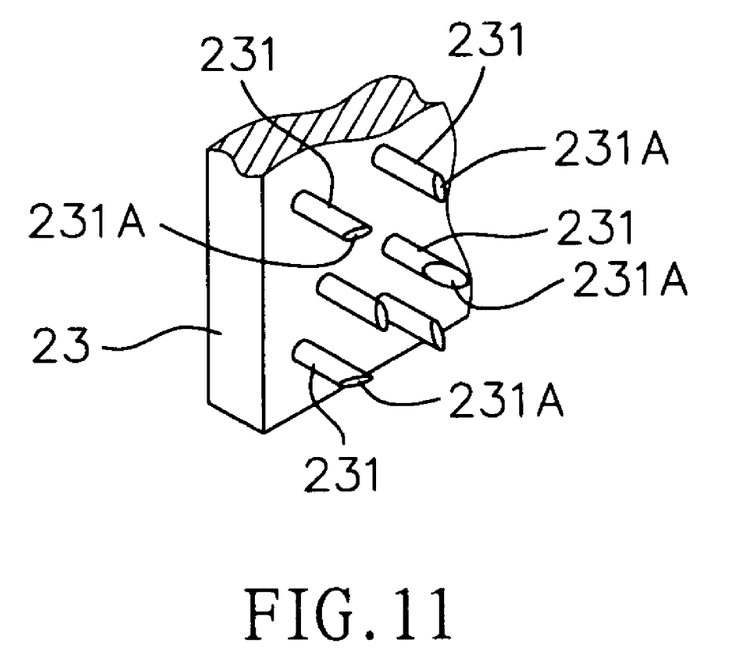
FIG. 11 is a perspective view of a selected portion of another preferred embodiment of the present invention.

Practically, the second stopper 23 can further comprise many sharp thorns 231. For example, the second stopper 23 comprises many sharp thorns 231. Each sharp thorn 231 has a tilted cutting surface. All these tilted cutting surfaces 231 have different cutting surface directions (as illustrated in FIG. 11).

If the user wants to increase the sensibility of this invention, it is suggested that the length of the rear plate portion 33 is longer than the one of the front plate portion 32. Under this circumstance, the rear plate portion 33 works as a longer loaded arm. A smaller applied force or weight will make the triggering plate 30 swinging (based on the principle of leverage).

Figure 8:
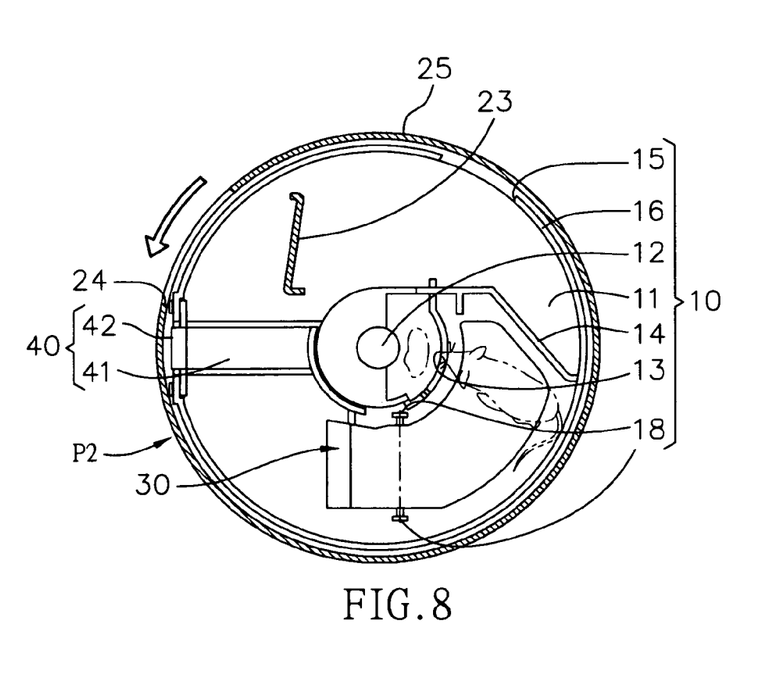
FIG. 8 is a view depicting this invention just triggered.
Figure 9:
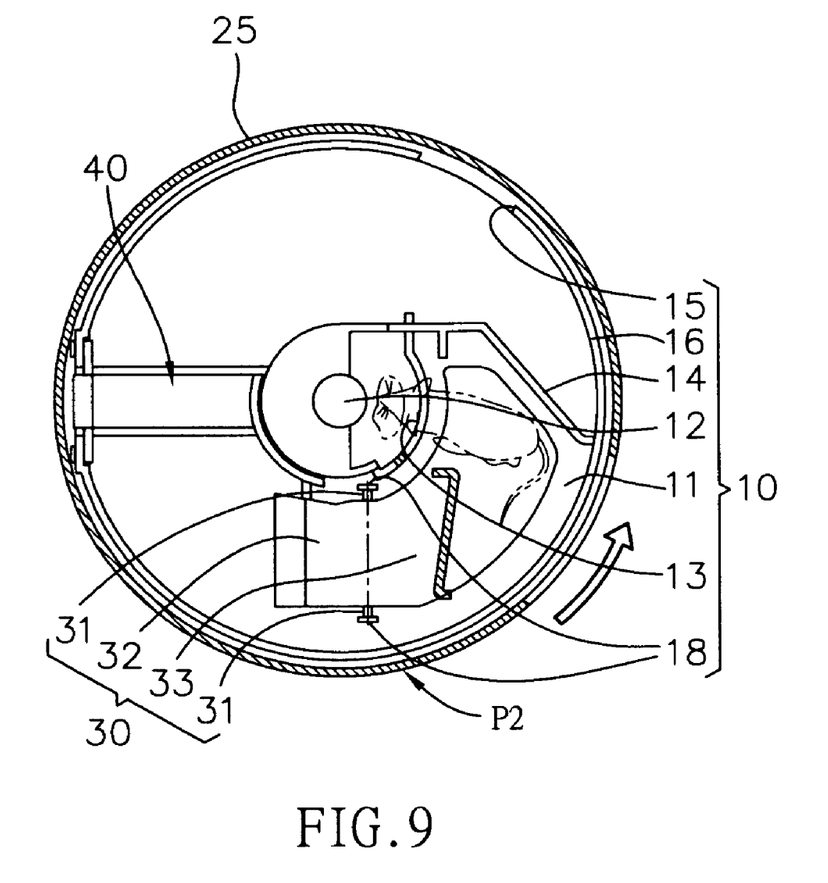
FIG. 9 is a view depicting this invention after triggering and a mouse has been trapped.

FIGS. 7, 8, and 9 illustrate the operation of the present invention. First, suitable bait is installed in the central bait housing 13. The rotatable cover 20 is turned to a setting position that it locks at the open position P1. At this moment, the locking portion 26 is engaged with the activating portion of the connecting rod assembly 40. Also, the second opening 24 and the first opening 15 are aligned to form an entrance allowing a mouse to crawl in.

Next, this invention can be put at an ideal place to attract mice. Assuming a mouse is attracted by the smell of the bait in the central bait housing 13, this mouse goes into the first receiving portion 17 (though the first opening 15 and the second opening 24). The mouse continues to crawl in along the fixed outer wall 16. This mouse crawls over the front plate portion 32 and then to the rear plate portion 33. Once the mouse presses down the rear plate portion 33, the rear plate portion 33 will swing down and the front plate portion 32 will lift up (swinging along the axis defined by the pivoting protrusions 31). Consequently, it will make the activating portion 42 releasing (separating from the locking portion 26, as shown in FIG. 10B).

Meanwhile, the torque generator 27 generates a rotating force to push the rotatable cover 20 rotating from the open position P1 to the close position P2. The second stopper 23 of the rotatable cover 20 moves to a position near the first stopper 14. Thus, the first opening 15 and the second opening 23 are not aligned. The mouse cannot escape. In addition, if the sharp thorns 231 are disposed on the second stopper 23 with different cutting surface directions, these sharp thorns 231 can stab in the body of the mouse. If case the mouse wants to escape by twisting, it will hurt more. Therefore, this design can significantly reduce the possibility of successful escape.

The advantages and functions of the present invention can be summarized as follows.

[1] The triggering sensibility is extremely high. In this invention, even a small force or weight (like a small mouse) applied on the rear plate portion 33, it will immediately make the triggering plate 30 swinging. The pivoting protrusions 31 and the pivoting seats 18 form an axis for swinging. Once it has been triggered, the front plate portion 32 lifts up to allow the activating portion 42 separating from the locking portion 26. Meanwhile, the rotatable cover 20 rotates back quickly to its close position P2. So, its triggering sensibility is extremely high.

[2] It can trap a mouse just smelling the bait. Before eating the bait, a mouse cautiously approaches the bait and finally crawls on the rear plate 33. Once the rear plate portion 33 is pressed down, this invention is immediately triggered to make the rotatable cover 20 moving to the close position P2. Although the mouse is very cautious before eating the bait, it still will be caught. Thus, the capture efficiency is excellent.

[3] The caught mouse is hard to escape. If sharp thorns 231 are disposed on the second stopper 23 with different cutting surface directions, these sharp thorns 231 will stab in the body of the mouse. Just a little twisting of the body would make the mouse hurt. It will reduce the possibility of the mouse to escape. Also, it will avoid the mouse to destroy the structure of the inner part of this invention. Thus, the caught mouse is hard to escape.

The above embodiments are only used to illustrate the present invention, not intended to limit the scope thereof. Many modifications of the above embodiments can be made without departing from the spirit of the present invention.

What is claimed is:

1. A mouse trap having a triggering plate comprising:

a stationary base having a circular bottom wall which is in a substantially horizontal plane, a central shaft, a central bait housing, a first stopper, a first opening, a fixed outer wall, a first receiving portion, and a pair of pivoting seats extending upward from the circular bottom wall; said central bait housing being secured on a middle part of said circular bottom wall, said central shaft extending upwardly through said central bait housing, said fixed outer wall being disposed on an outer edge of said circular bottom wall;

a rotatable cover having a circular cover, a central shaft hole, a second stopper, a second opening, a rotatable outer wall, a locking portion and a torque generator; said rotatable cover rotating relative to said central shaft and said stationary base; said torque generator being provided to create a torque forcing said rotatable cover to tend to rotate from an open position to a closed position;

a triggering plate having a pair of pivoting protrusions, a front plate portion, and a rear plate portion, said pivoting protrusions being pivoted within said pivoting seats formed on the circular bottom wall; said pivoting protrusions forming an invisible pivoting axis for triggering the plate; said triggering plate being in a substantially horizontal plane above the circular bottom wall; and said rear plate portion being longer than said front plate portion;

a connecting rod assembly having a linking portion and an activating portion; said linking portion having two ends, one end of said two ends of said linking portion connecting to said front plate portion, the other end of said two ends of said linking portion connecting to said activating portion; a relationship between said activating portion and said locking portion being selected from engagement or separation;

when said rear plate portion is pressed by a predetermined weight, said rear plate portion displaces downwardly and said front plate portion displaces upwardly simultaneously, so as to lift up said linking portion and then said activating portion and said locking portion become separated so that said rotatable cover can rotate from said open position to said closed position for avoiding a caught object blocked by said second stopper from escaping.

* * * * *